(12) United States Patent
Olson et al.

(10) Patent No.: US 11,361,324 B2
(45) Date of Patent: Jun. 14, 2022

(54) BLOCKCHAIN-ISSUED VERIFIABLE CREDENTIALS FOR PORTABLE TRUSTED ASSET CLAIMS

(71) Applicant: International Business Machines Corporation, Armonk, NY (US)

(72) Inventors: Timothy Olson, Port Orchard, WA (US); Petr Novotny, Mount Kisco, NY (US); Nitin Gaur, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/088,059

(22) Filed: Nov. 3, 2020

(65) Prior Publication Data

US 2022/0138769 A1    May 5, 2022

(51) Int. Cl.
| | | |
|---|---|---|
| *G06Q 40/00* | (2012.01) | |
| *G06Q 30/00* | (2012.01) | |
| *G06Q 10/10* | (2012.01) | |
| *G06Q 20/38* | (2012.01) | |
| *G06Q 40/04* | (2012.01) | |

(Continued)

(52) U.S. Cl.
CPC ..... *G06Q 30/0185* (2013.01); *G06F 16/2379* (2019.01); *G06Q 10/10* (2013.01); *G06Q 20/389* (2013.01); *G06Q 20/38215* (2013.01); *G06Q 20/401* (2013.01); *G06Q 40/04* (2013.01); *H04L 9/3247* (2013.01); *H04L 63/20* (2013.01);
(Continued)

(58) Field of Classification Search
None
See application file for complete search history.

(56) References Cited

U.S. PATENT DOCUMENTS 10,453,319 B2   10/2019 Jarvis et al.
10,503,916 B2   12/2019 Murphy et al.
(Continued)

OTHER PUBLICATIONS

Windley, P. J., "Multisource Digital Identity", Sep. 19, 2019. [Online], Available: https://ieeexplore.IEEE.org/stamp/stamp.jsp?tp=&arnumber=8844799.*
Anonymous. "Method and System for Policy Driven Blockchain Compliance Verification." Published May 13, 2019. 4 pages. Published by IP.com. https://priorart.ip.com/IPCOM/000258459.
(Continued)

*Primary Examiner* — Olabode Akintola
(74) *Attorney, Agent, or Firm* — Jared L. Montanaro

(57) ABSTRACT

A processor may register one or more verifiable asset credential schemas. A verifiable asset credential schema may prescribe the format and content of asserting blockchain-backed asset state. The processor may register an issuer policy for the verifiable asset credentials. The issuer policy may be associated with a schema and intended credential holder(s). The processor may subscribe the asset credential issuer to one or more peers on the blockchain. The processor may issue commit notifications to a subscribing asset credential issuer in the form of schema-compliant committing-peer verifiable credentials. The processor may collect the committing-peer verifiable credentials from one or more peers. The processor may validate the committing-peer verifiable credentials satisfy the security policy and schema for a designated intended credential holder. The processor may issue a schema-compliant verifiable asset credential to the policy-designated credential holder(s).

20 Claims, 8 Drawing Sheets

(51) Int. Cl.
  *G06Q 20/40* (2012.01)
  *G06F 16/23* (2019.01)
  *H04L 9/40* (2022.01)
  *H04L 9/32* (2006.01)
  *G06Q 20/06* (2012.01)
  *G06Q 20/36* (2012.01)

(52) U.S. Cl.
  CPC ..... *G06Q 20/0655* (2013.01); *G06Q 20/3674* (2013.01); *G06Q 2220/00* (2013.01)

(56) References Cited

U.S. PATENT DOCUMENTS

| | | |
|---|---|---|
| 2011/0307714 A1 | 12/2011 | Comrie |
| 2016/0283920 A1 | 9/2016 | Fisher |
| 2016/0330034 A1 | 11/2016 | Back |
| 2017/0212781 A1 | 7/2017 | Dillenberger |
| 2018/0253452 A1* | 9/2018 | Callan ............... H04L 9/14 |
| 2020/0067789 A1* | 2/2020 | Khuti ............... G06F 16/254 |
| 2020/0162256 A1 | 5/2020 | Pourtabatabaie et al. |

OTHER PUBLICATIONS

Anonymous. "Single point Social media or Group content control and authenticity" Published Jul. 12, 2019. 3 pages. Published by IP.com. https://priorart.ip.com/IPCOM/000259097.

Anonymous. "System and method for providing a tamper-proof and trustless mechanism to validate the usage of IT assets." Published Feb. 13, 2018. 4 pages. Published by IP.com. https://priorart.ip.com/IPCOM/000252805.

Aydar, M., et al., "Towards a Blockchain based digital identity verification, record attestation and record sharing system." Published Jun. 23, 2020. 22 pages. Published by ARXIV. https://arxiv.org/abs/1906.09791.

Lesavre, L., et al., "A Taxonomic Approach to Understanding Emerging Blockchain Identity Management Systems." Published Jan. 14, 2020. 62 pages. Published by National Institute of Standards and Technology, https://doi.org/10.6028/NIST.CSWP.01142020.

Mell, et al., "The NIST Definition of Cloud Computing," Recommendations of the National Institute of Standards and Technology, U.S. Department of Commerce, Special Publication 800-145, Sep. 2011, 7 pgs.

\* cited by examiner

BLOCKCHAIN-ISSUED VERIFIABLE CREDENTIALS FOR PORTABLE TRUSTED ASSET CLAIMS

BACKGROUND

The present disclosure relates generally to the field of trusted asset data, and more specifically to reducing loads on blockchain peers for trusted asset data claims.

Currently, blockchain ledger-held data is not portable and access to a ledger is required to query for trusted asset data. Accordingly, there is a performance load put on peers in a blockchain network each time the trusted asset data is needed and the ledger is accessed. Further, the access exposes the ledger to higher security risk each time the ledger has to be accessed to query for the trusted asset data.

SUMMARY

Embodiments of the present disclosure include a method, system, and computer program for blockchain-issued verifiable credentials for portable trusted asset claims. A processor, referred to as an Asset Credential Issuer or VAC Issuer, may register one or more verifiable asset credential (VAC) schemas. A verifiable asset credential schema may be a plan for verifiably asserting blockchain-backed data associated with one or more assets. A processor may register an issuer policy for the verifiable asset credentials. The issuer policy may be associated with a schema and intended credential holder(s). The processor may subscribe the asset credential issuer to one or more peers on the blockchain. The processor may issue commit notifications to the subscribing asset credential issuer in the form of schema-compliant committing-peer verifiable credentials. The processor may collect the committing-peer verifiable credentials from one or more peers. The processor may validate the committing-peer verifiable credentials satisfy the security policy and schema for a designated intended credential holder. The processor may issue a schema-compliant verifiable asset credential to the policy-designated credential holder(s).

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
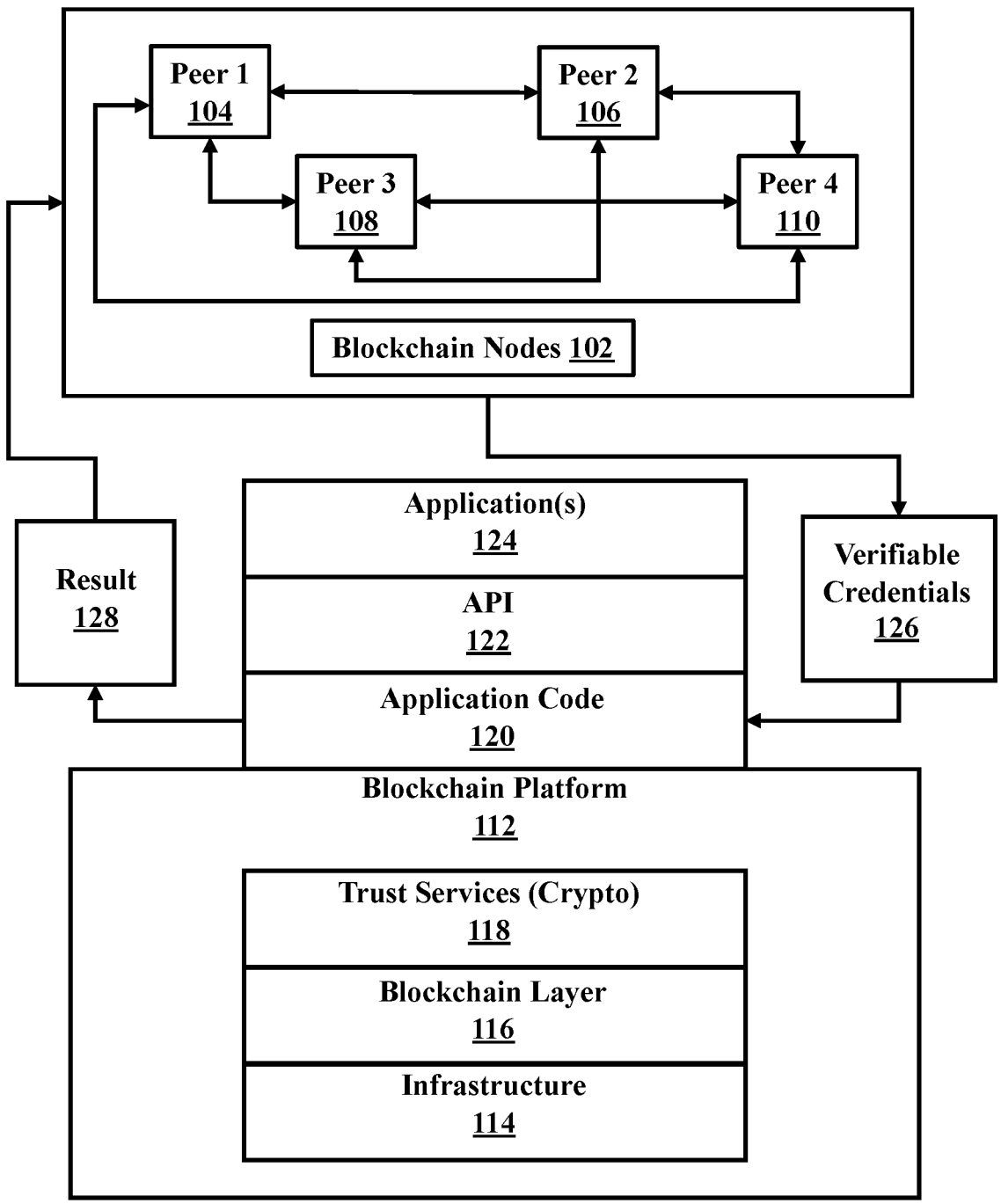
FIG. 1A illustrates an example blockchain architecture, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of trusted asset data, and more specifically to reducing loads on blockchain peers for trusted asset data claims. Currently, blockchain ledger-held data is not portable and access to a ledger is required to query for asset data. Consequently, there is a performance load put on peers in a blockchain network each time the asset data is needed and the ledger is accessed. For instance, current state data (of an asset, of assets) and reconstructing historical transactions load (e.g., computing strain, power strain, etc.) a peer. Additionally, multiple peers may be queried to verify a consistent state, thus increasing an overall load on the peers in the blockchain network.

Further, the required access to the ledger to query for asset data exposes the ledger to a higher security risk each time the ledger is accessed. For example, the access(es) expand the attack surface by having more parties (e.g., peers, nodes, etc.) interacting during the access(es), e.g., more parties requiring authentication/authorization.

Further, stringent security precautions for accessing blockchains holding sensitive data further limits the ability to share non-sensitive portions of the data.

Accordingly, there is a need for a multiple-party assured consensus of an asset state without querying a ledger/ledgers. Discussed herein are a method, system, and computer program product which are a solution to the held need. The benefits of a multiple-party assured consensus of an asset state without querying a ledger majoritively include, but are not limited to, removing performance load on peers and minimizing attack surface. A further benefit is that as described herein, asset claims become portable, that is, asset claims can be used independent of blockchain ledger access via the blockchain-issued verifiable asset credential.

It will be readily understood that the instant components, as generally described and illustrated in the figures herein, may be arranged and designed in a wide variety of different configurations. Accordingly, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Detailed herein are a method, system, and computer program product that utilize specialized blockchain components (discussed in more detail below) to reduce loads on blockchain peers for trusted asset (e.g., assets associated/verifiable with verifiable credentials) data claims.

In some embodiment, the method, system, and/or computer program product utilize a decentralized database (such as a blockchain) that is a distributed storage system, which includes multiple nodes that communicate with each other. The decentralized database may include an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency.

In various embodiments, a permissioned and/or a permission-less blockchain can be used. In a public, or permission-less, blockchain, anyone can participate without a specific identity (e.g., retaining anonymity). Public blockchains can involve native cryptocurrency and use consensus based on various protocols such as Proof of Work. On the other hand, a permissioned blockchain database provides secure interactions among a group of entities which share a common goal but which do not fully trust one another, such as businesses that exchange funds, goods, (private) information, and the like.

Further, in some embodiment, the method, system, and/or computer program product can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode (such as managing access to an off-chain datastore/database). In some embodiments, the method, system, and/or computer program product can further utilize smart contracts that are trusted distributed applications which leverage tamper-proof properties of the blockchain database and an underlying agreement between nodes, which is referred to as an endorsement or endorsement policy.

An endorsement policy allows chaincode to specify endorsers for a transaction in the form of a set of peer nodes that are necessary for endorsement. When a client sends the transaction to the peers (e.g., endorsers) specified in the endorsement policy, the transaction is executed to validate the transaction. After validation, the transactions enter an ordering phase in which a consensus protocol is used to produce an ordered sequence of endorsed transactions grouped into blocks.

In some embodiment, the method, system, and/or computer program product can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node).

Another type of node is a peer node which can receive client submitted transactions, commit the transactions, and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing/confirming transactions and modifying a world state of the blockchain, which is another name for the initial blockchain transaction which normally includes control and setup information.

In some embodiment, the method, system, and/or computer program product can utilize a ledger that is a sequenced, tamper-resistant record of all state transitions of a blockchain. State transitions may result from chaincode invocations (e.g., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database that maintains a current state of the blockchain.

In some embodiment, the method, system, and/or computer program product described herein can utilize a chain that is a transaction log that is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (e.g., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated) upon peer node startup, and before transactions are accepted.

Some benefits of the instant solutions described and depicted herein include a method, system, and computer program product for implementing new, novel blockchain components that help reduce loads on blockchain peers for trusted asset data claims. The exemplary embodiments solve the issues of peer loads by extending features of a database such as immutability, digital signatures and being a single source of truth (e.g., thus eliminating the need for all peers to be used for/during a transaction).

It is noted that blockchain is different from a traditional database in that blockchain is not a central storage, but rather a decentralized, immutable, and secure storage, where nodes may share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the system described herein is implemented due to immutable accountability, security, privacy, permitted decentralization, availability of smart contracts, endorsements and accessibility that are inherent and unique to blockchain.

In particular, the blockchain ledger data is immutable, which provides for an efficient method for portable trusted asset claims of blockchain-issued verifiable asset credentials. Also, use of the encryption in the blockchain provides security and builds trust. The smart contract manages the state of the asset to complete the life-cycle. The example blockchains are permission decentralized. Thus, each end user may have its own ledger copy to access. Multiple organizations (and peers) may be on-boarded on the blockchain network. The key organizations may serve as endorsing peers to validate the smart contract execution results, read-set and write-set. In other words, the blockchain inherent features provide for efficient implementation of portable trusted asset claims.

One of the benefits of the example embodiments is that it improves the functionality of a computing system by implementing a method for portable trusted asset claims of blockchain-issued verifiable asset credentials (e.g., by registering one or more verifiable credential schemas that can be used in conjunction with one or more selected peers in a blockchain, thus eliminating the need for all peers in the blockchain to be used for/during a transaction involving verifiable asset credentials). As such, it is noted that the blockchain is not just a database; the blockchain comes with capabilities to create a network of users and to on-board/off-board organizations to collaborate and execute service processes in the form of smart contracts (which may be associated with verifiable asset credentials and/or schemas).

The example embodiments provide numerous benefits over a traditional database. For example, through the blockchain, the embodiments provide for immutable accountability, security, privacy, permitted decentralization, availability of smart contracts, endorsements and accessibility that are inherent and unique to the blockchain.

Meanwhile, a traditional database could not be used to implement the example embodiments because it does not bring all parties on the network, it does not create trusted collaboration and does not provide for an efficient commitment of transactions backing the verifiable asset credentials. The traditional database does not provide for tamper proof storage and does not provide for multi-party consensus of an asset state via issuance of a verifiable asset credential following a committed transaction. Thus, the proposed embodiments described herein utilizing blockchain networks cannot be implemented by the traditional database.

Meanwhile, if a traditional database were to be used to implement the example embodiments, the example embodiments would have suffered from unnecessary drawbacks such as lack of security and slow speed of transactions. Accordingly, the example embodiments provide for a specific solution to a problem in the arts/field of verifiable asset credential transactions.

The example embodiments also change how data may be transferred within a blockchain network or between blockchain networks. For example, the blockchain-assured state of an asset (e.g., trusted asset, verifiable credential associated with the asset, etc.) is asserted by components of the blockchain itself. In such an embodiment, there is blockchain-backed multi-party assurance, where the distributed consensus mechanism and notification process of distributed ledger technology of the blockchain is leveraged to provide multi-party and/or multi-ledger assurance of the asset state without extra load on peers (e.g., committing peers).

Further, the example embodiment also changes components of the blockchain itself. For instance, in order to have the convenience of a single issuer (e.g., thus alleviating loads on some peers), a consortium-trusted component of the blockchain network is embodied. The consortium-trusted component may issue a digitally signed verifiable asset credential (described more fully in regard to FIG. 2) and may update a revocation registry when a verifiable asset credential is superseded (e.g., is replaced, ownership of the asset associated with the verifiable asset credential is changed, etc.). Thus, there is no need for end-users to query multiple peers for/during a transaction involving the verifiable asset credential(s).

In such an embodiment, content and distribution of issued (trusted asset) claims/transactions are governed via immutable blockchain configuration objects, which provide an extension of the same security controls used to control ledger queries and further, status of issued verifiable asset credentials are automatically maintained by an issuer in a revocation registry (all things that a traditional database could not do).

Turning now to FIG. 1A, illustrated is a blockchain architecture 100, in accordance with embodiments of the present disclosure. In some embodiments, the blockchain architecture 100 may include certain blockchain elements, for example, a group of blockchain nodes 102. The blockchain nodes 102 may include one or more blockchain nodes, e.g., peers 104-110 (these four nodes are depicted by example only). These nodes participate in a number of activities, such as a blockchain transaction addition and validation process (consensus). One or more of the peers 104-110 may endorse and/or recommend transactions based on an endorsement policy and may provide an ordering service for all blockchain nodes 102 in the blockchain architecture 100. A blockchain node may initiate a blockchain authentication and seek to write to a blockchain immutable ledger stored in blockchain layer 116, a copy of which may also be stored on the underpinning physical infrastructure 114. The blockchain configuration may include one or more applications 124 which are linked to application programming interfaces (APIs) 122 to access and execute stored program/application code 120 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 104-110.

The blockchain base or platform 112 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 116 may expose an interface that provides access to the virtual execution environment necessary to process the program code and engage the physical infrastructure 114. Cryptographic trust services 118 may be used to verify transactions such as asset exchange transactions and keep information private.

The blockchain architecture 100 of FIG. 1A may process and execute program/application code 120 via one or more interfaces exposed, and services provided, by blockchain platform 112. The application code 120 may control blockchain assets. For example, the application code 120 can store and transfer data, and may be executed by peers 104-110 in the form of a smart contract and associated chaincode with conditions or other code elements subject to its execution. As a non-limiting example, smart contracts may be generated to execute the transfer of assets/resources, the generation of assets/resources, etc. The smart contracts can themselves be used to identify rules associated with authorization (e.g., asset transfer rules, restrictions, etc.), access requirements (e.g., of a datastore, of an off-chain datastore, of who may participate in a transaction, etc.), and/or usage of the ledger. For example, the verifiable credentials 126 may be processed by one or more processing entities (e.g., virtual machines) included in the blockchain layer 116. The result 128 may include a plurality of linked shared documents (e.g., with each linked shared document recording the issuance of a smart contract in regard to the verifiable credentials 126 being committed by a selected group of peers based on a verifiable credential schema, issuer policy, etc.). In some embodiments, the physical infrastructure 114 may be utilized to retrieve any of the data/information/assets/etc. described herein.

A smart contract may be created via a high-level application and programming language, and then written to a block in the blockchain. The smart contract may include executable code which is registered, stored, and/or replicated with a blockchain (e.g., a distributed network of blockchain peers). A transaction is an execution of the smart contract code that can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details (e.g., thus committing a transaction associated with verifiable credentials/trusted assets, etc.).

Figure 1B:
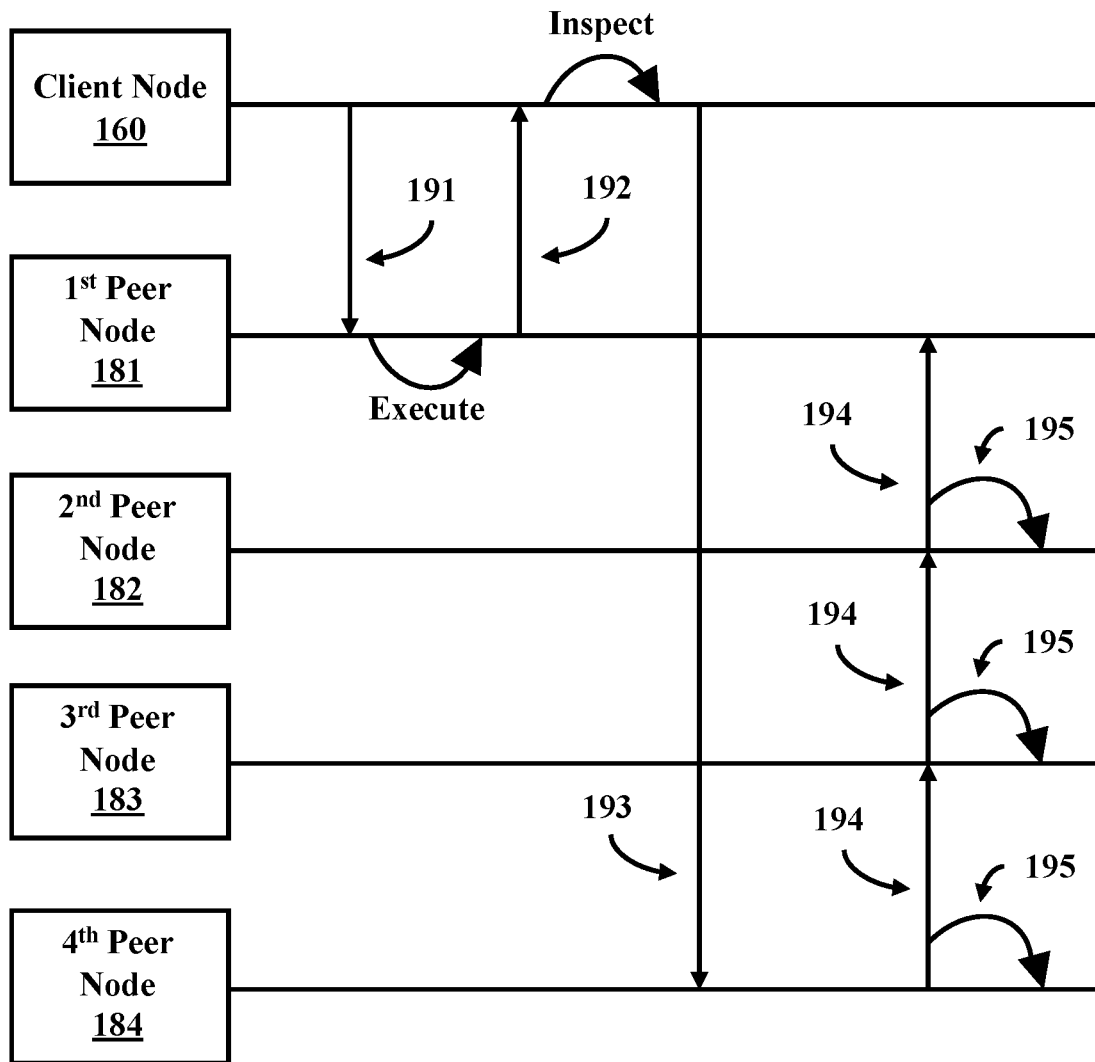
FIG. 1B illustrates a blockchain transactional flow, in accordance with embodiments of the present disclosure.

FIG. 1B illustrates an example of a blockchain transactional flow 150 between nodes of the blockchain in accordance with an example embodiment. Referring to FIG. 1B, the transaction flow may include a transaction proposal 191 sent by an application client node 160 to an endorsing peer node 181 (e.g., in some embodiments, the transaction proposal 191 may include a schema that prescribes a selected set of peers [peer nodes 181-184] to be used for a specific transaction [that includes verifiable credentials/trusted assets]). The endorsing peer 181 may verify the client signature and execute a chaincode function to initiate the transaction. The output may include the chaincode results, a set of key/value versions that were read in the chaincode (read set), and the set of keys/values that were written in chaincode (write set). The proposal response 192 is sent back to the client 160 along with an endorsement signature, if approved. The client 160 assembles the endorsements into a transaction payload 193 and broadcasts it to an ordering service node 184. The ordering service node 184 then delivers ordered transactions as blocks to all peers 181-183 on a channel. Before committal to the blockchain, each peer 181-183 may validate the transaction. For example, the peers may check the endorsement policy to ensure that the correct allotment of the specified peers have signed the results and authenticated the signatures against the transaction payload 193 (e.g., all the specified peers from the schema have validated and approved commitment of the transaction to the blockchain).

Referring again to FIG. 1B, the client node 160 initiates the transaction 191 by constructing and sending a request to the peer node 181, which in this example is an endorser. The client 160 may include an application leveraging a supported software development kit (SDK), which utilizes an available API to generate a transaction proposal 191. The proposal is a request to invoke a chaincode function so that data can be read and/or written to the ledger. The SDK may reduce the package of the transaction proposal 191 into a properly architected format (e.g., protocol buffer over a remote procedure call (RPC)) and take the client's cryptographic credentials to produce a unique signature for the transaction proposal 191.

In response, the endorsing peer node 181 may verify (a) that the transaction proposal 191 is well formed, (b) the transaction has not been submitted already in the past (replay-attack protection), (c) the signature is valid, and (d) that the submitter (client 160, in the example) is properly authorized to perform the proposed operation on that channel. The endorsing peer node 181 may take the transaction proposal 191 inputs as arguments to the invoked chaincode function. The chaincode is then executed against a current state database to produce transaction results including a response value, read set, and write set. However, no updates are made to the ledger at this point. In some embodiments, the set of values, along with the endorsing peer node's 181 signature is passed back as a proposal response 192 to the SDK of the client 160 which parses the payload for the application to consume.

In response, the application of the client 160 inspects/verifies the endorsing peers signatures and compares the proposal responses to determine if the proposal response is the same. If the chaincode only queried the ledger, the application would inspect the query response and would typically not submit the transaction to the ordering node service 184. If the client application intends to submit the transaction to the ordering node service 184 to update the ledger, the application determines if the specified endorsement policy has been fulfilled before submitting. Here, the client may include only one of multiple parties to the transaction. In this case, each client may have their own endorsing node, and each endorsing node will need to endorse the transaction (it is noted that described herein is a solution to needing each endorsing node to endorse a transaction). The architecture is such that even if an application selects not to inspect responses or otherwise forwards an unendorsed transaction, the endorsement policy will still be enforced by peers and upheld at the commit validation phase.

After successful inspection, in the transaction payload step 193, the client 160 assembles endorsements into a transaction and broadcasts the transaction proposal 191 and response within a transaction message to the ordering node 184. The transaction may contain the read/write sets, the endorsing peers signatures and a channel ID (e.g., if a specific [off-chain] datastore is to be utilized). The ordering node 184 does not need to inspect the entire content of a transaction in order to perform its operation, instead the ordering node 184 may simply receive transactions from all channels in the network, order them chronologically by channel, and create blocks of transactions per channel.

The blocks of the transaction are delivered from the ordering node 184 to all peer nodes 181-183 on the channel. The transactions 194 within the block are validated to ensure any endorsement policy is fulfilled and to ensure that there have been no changes to ledger state for read set variables since the read set was generated by the transaction execution. Transactions in the block are tagged as being valid or invalid. Furthermore, in steps 195 each peer node 181-183 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 2:
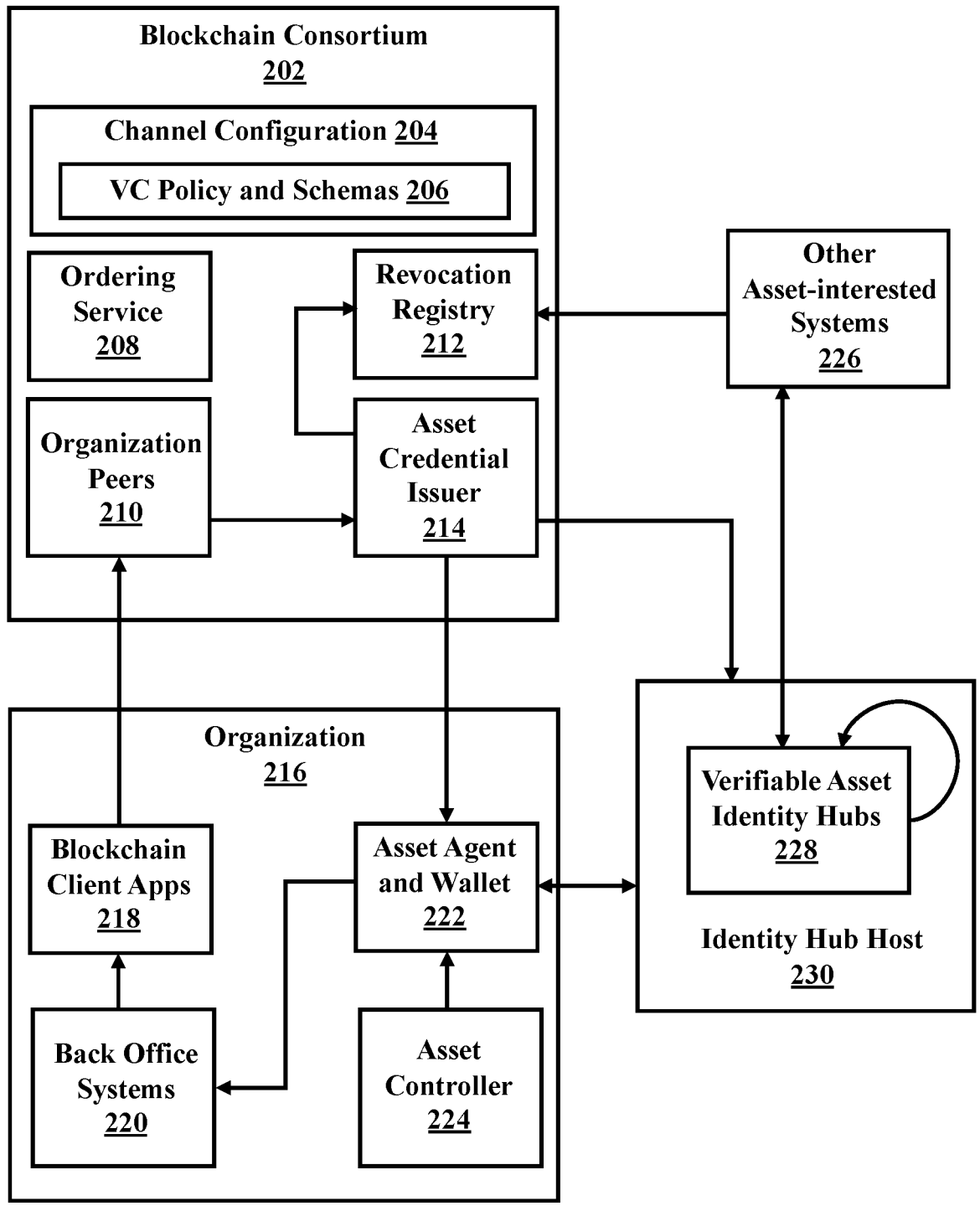
FIG. 2 illustrates an example system for portable trusted asset claims of blockchain-issued verifiable credentials, in accordance with embodiments of the present disclosure.

Referring now to FIG. 2, illustrated is an example blockchain network 200 for portable trusted asset claims of blockchain-issued verifiable asset credentials, in accordance with embodiments of the present disclosure. In some embodiments, the blockchain network 200 includes a blockchain consortium 202, an organization 216, other asset-interested systems 226, and an identity hub host 230.

In some embodiments, the blockchain consortium 202 includes a channel configuration 204, an ordering service 208, organization peers 210, a revocation registry 212, and an asset credential issuer 214. In some embodiments the channel configurations 204 includes a verifiable credential (VC) policy and schemas 206.

In some embodiments, the organization 216 includes blockchain client applications 218, back office systems 220, an asset agent and wallet 222, and an asset controller 224 (which may control the asset agent and wallet 222 and/or control one or more the schemas discussed herein, e.g., the asset controller 224 can have input as to which and/or how many committing peers-issued verifiable credentials are required in order for the Asset Credential Issuer 214 to issue a verifiable asset credential). In some embodiments, the identity hub host 230 includes verifiable asset identity hubs 228.

In some embodiments, the channel configuration 204 registers the VC policy and schemas 206 as they relate to an asset to be associated with a verifiable asset credential or verifiable asset credentials. In some embodiments, the VC policy of the VC policy and schemas 206 may be a VC issuer policy, which may be a policy associated with a trusted Asset Credential Issuer 214 of a consortium and which details the issuer's involvement in a transaction involving the asset. In some embodiments, after registering the VC policy and schemas 206, the Asset Credential Issuer 214 subscribes to one or more organization peers 210 commit notifications IAW the VC policy and schemas.

In some embodiments, upon a peer commit (e.g. of the organization peers 210) a verifiable credential(s) is issued. In some embodiments, the peer commit verifiable credential that is issued, is issued to the asset credential issuer 214 by the organization peers 210. In some embodiments, the asset credential issuer 214 collects and validates the verifiable credential(s) from the organization peers 210 IAW the associated VC policy and schemas 206. In some embodiments, the asset credential issuer 214 issues a revocation of a prior verifiable asset credential(s) and the revocation registry 212 revokes the prior verifiable asset credential(s).

In some embodiments, in a public schema (e.g., identifying asset state attributes published in a non-subject (asset) held VAC) the asset credential issuer 214 issues a verifiable asset credential(s) to non-subject (i.e. asset) holder(s), e.g., the identity hub host 230, which holds the received VAC in a verifiable asset identity hubs 228 which is able to be queried by other asset-interested systems 226. In some embodiments, as depicted by the loop, the verifiable asset identity hubs 228 performs instance synchronization of the VACs it holds with other 228 hub instances for availability, reliability, and performance. In some embodiments, other asset-interested systems 226 query and validate asset attributes via verifiable asset presentations of the verifiable asset credential(s) received in queries to non-subject held repositories e.g. verifiable asset identity hubs 228. In some embodiments, the verifiable presentations are from a third party agent or repository. In some embodiments, the asset-interested systems 226 check a credential status of a verifiable asset credential(s) within the revocation registry 212 to determine if a verifiable credential(s) is valid.

In some embodiments, in a private schema (e.g., involving asset state attributes published in subject-held VACs) is used by the asset credential issuer 214 to issue a verifiable credential to the asset itself (the VAC's subject), e.g., the VAC is held by the asset agent and wallet 222 (of the organization 216). In some embodiments, the asset agent and wallet 222 presents verifiable presentations of a verifiable asset credential directly to another party e.g. back office systems 220 (of the organization 216). In some embodiments, the asset agent and wallet 222 holds VACs in other locations e.g. verifiable asset identify hubs 228. In some embodiments, the back office systems 220, query an asset agent and wallet 222 for authoritative asset state information for some business purpose. The asset agent presents a verifiable presentation of the requested attributes to the back office system 220.

In some embodiments, the blockchain client applications 218 communication with the organization peers 210 (of the blockchain consortium 210) and during the communication, the asset-related transaction proposal may be endorsed. In some embodiments, the ordering service 208 (of the blockchain consortium 210) can be configured to receive transactions, order the transactions into blocks, and/or distribute blocks to nodes in the blockchain.

It is noted that compared to traditional blockchain networks, the blockchain network 200 includes the novel components and associated protocols of:

Configuration objects, which includes the VC policy and schemas 206, where the VC schemas are configured for committing peers and asset issuer and the VC policy/policies can be a schema-specific asset issuer policy that is configured for determining how many, and which of the, committing peers are required to provide committing peer-issued VACs in order for the asset credential issuer 214 to issue a blockchain VAC. Further, in some embodiments, the VC policy may include authorized holder(s) and authorized schema of a verifiable asset credentials, e.g., who is authorized to hold what type of information about a particular asset. In some embodiments, it is noted that by agreeing to the VC policy and schemas 206, the network stakeholders (e.g., entities, asset controller 224, etc.) collectively define and sign off on which type of asset data will be exposed to which hub(s) (of the blockchain consortium 202), e.g., which data and how is the data leaving the network boundary;

Asset credential issuer 214, which subscribes to committing peers in conformance with an asset's schema and policy, collects and validates verifiable asset credentials issued by committing peers in conformance with an asset's VAC policy and schema, composes and signs schema-compliant verifiable asset credentials, issues verifiable asset credentials to authorized holders in agreement with a schema's policy (e.g., subject-held verifiable credentials (private schemas) or non-subject-held verifiable credentials (public schemas)), revokes superseded verifiable asset credentials; and Revocation registry 212, which holds and/or provides a status of all issued verifiable credentials (e.g., revoked or non-revoked).

It is further noted that compared to traditional blockchain networks, the blockchain network 200 includes the novel steps of:

Registering a verifiable credential class, where the novel outcome of such a step is that the schema and security policy for a verifiable credential are configured in the blockchain. The VC schema may include content related to/associated with the asset but not stored-on ledger. Further, the VC schema security policy may include: which and how many committing peers-issued VC's are required to be collected and validated by the Asset Credential Issuer prior to issuing its verifiable asset credential(s), and who is/are authorized holder(s) of the verifiable credential;

Subscribing to committing-peer-issued VCs asserting to information committed on-ledger, with the novel outcome being that the asset credential issuer is subscribed to the proper committing peers in agreement with the schema security policy;

Issuing the peer commit in the form of verifiable credential(s), with the novel outcomes being that upon a transaction commit: committing peer generates a notification message in the form of a peer VC schema, issues the verifiable credential(s) to a subscribing asset credential issuer (e.g., 214); and VC schema can include any fields from the ledger, not just what changed in the transaction;

Issuing a verifiable asset credential, with the novel outcome being pre-configured holders (e.g., subject and non-subject holders) that have been issued schema-conformant verifiable credential(s) from the asset credential issuer 214, in such an embodiment, the pre-configured asset credential issuer 214 collects and validates committing peer verifiable credential(s) in agreement with the security policy and/or compose, sign, and issue schema-compliant verifiable asset credential(s) to registered holders;

Revoking asset verifiable credential(s), with the novel outcome being that previously issued verifiable asset credential(s) are marked as revoked/expired in revocation registry 212 (which assures any verifiers that a given VAC is still valid and represents the true state of the asset in the ledger); and Checking a credential status, with the novel outcome being that the revocation registry 212 returns a status of a verifiable asset credential, which either confirms or denies expiry and which assures that the VAC accurately represents the current on-ledger state of the asset without needing to query the peers.

Figure 3A:
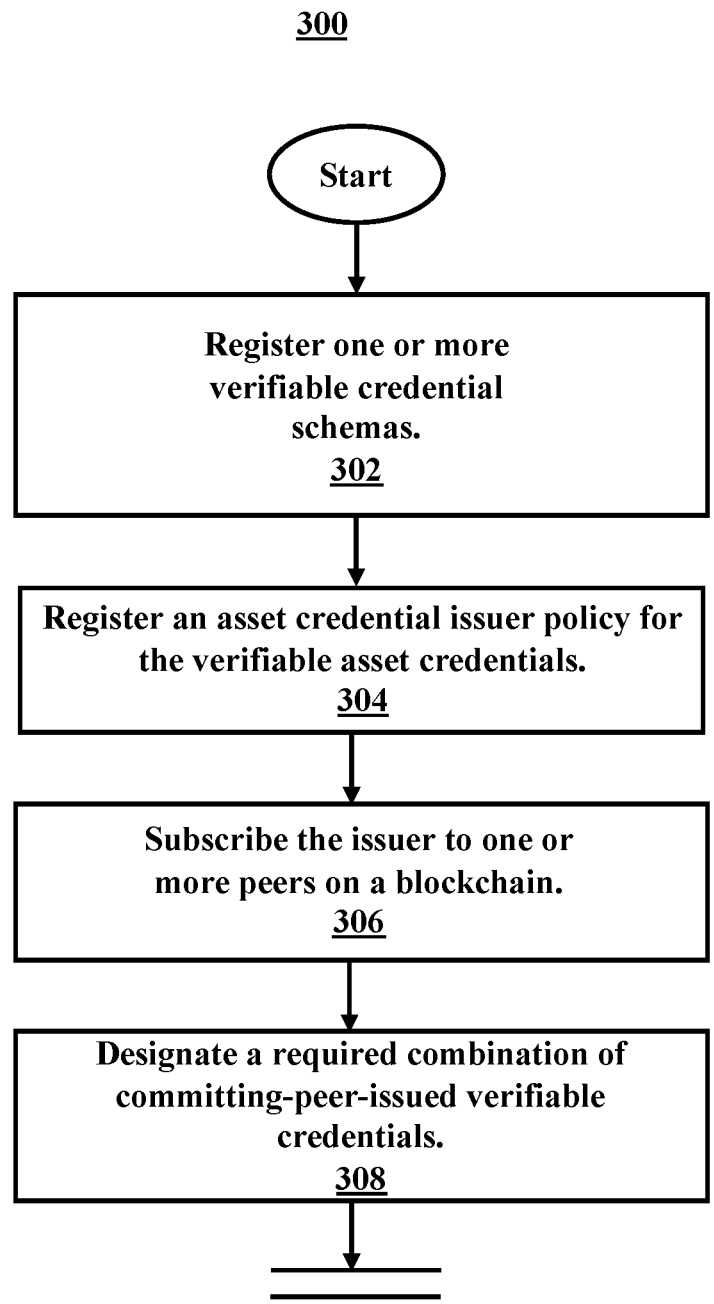
FIG. 3A illustrates a flowchart of an example method for portable trusted asset claims of blockchain-issued verifiable credentials, in accordance with embodiments of the present disclosure.
Figure 3B:
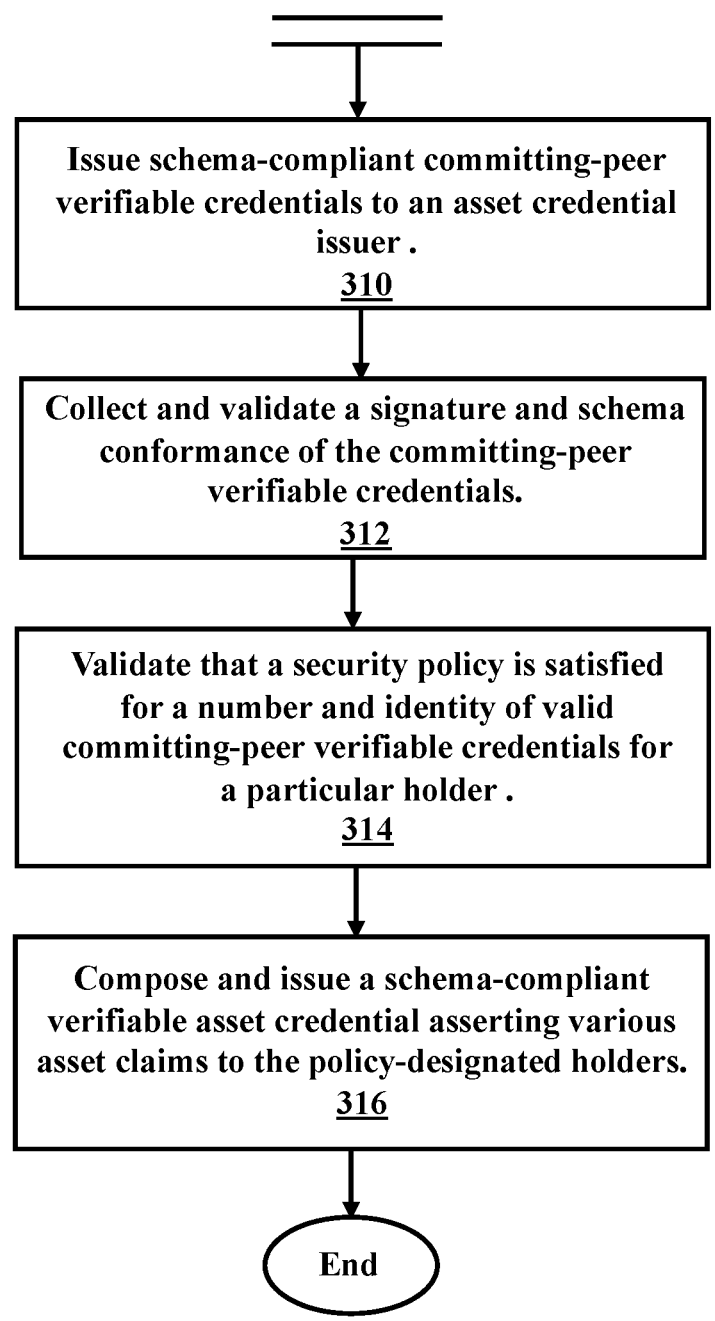
FIG. 3B illustrates a flowchart of a continuing example method for portable trusted asset claims of blockchain-issued verifiable credentials, in accordance with embodiments of the present disclosure.

Referring now to FIGS. 3A and 3B, illustrated is a flowchart of example methods 300 and 350 for portable trusted asset claims of blockchain-issued verifiable asset credentials. In some embodiments, the methods 300 and/or 350 may be performed by a processor, node, and/or peer node in a blockchain network (such as the blockchain network 200 of FIG. 2). It is noted that a processor used herein can be any of the designated actors discussed throughout this disclosure. In some embodiments, the method 300 begins at operation 302, where the processor registers one or more verifiable credential schemas. In some embodiments, a verifiable credential schema is a permitted format and content for asserting on-ledger asset data.

In some embodiments, the method 300 proceeds to operation 304. At operation 304, the processor may register an issuer policy for the verifiable asset credentials. In some embodiments, the issuer policy is associated with a committing peer 210 or an asset credential issuer 214. In some embodiments, the method 300 proceeds to operation 306, where the processor subscribes the issuer to one or more peers (e.g., one or more other peers) on the blockchain. In some embodiments, the method 300 proceeds to operation 308, where the processor designates a required combination of committing-peer-issued verifiable credentials that are required be received to be considered valid. In some embodiments, after operation 308 the method 300 may end. In some embodiments, the method 300 may proceed to operation 310 of FIG. 3B in regard to method 350.

In some embodiments, at operation 310, the processor issues, upon committing a transaction, schema-compliant committing-peer verifiable credentials to an asset credential issuer. In some embodiments, the method 350 proceeds to operation 312, where the processor collects and validates a signature and schema conformance of the committing-peer verifiable credentials. In some embodiments, the method 350 proceeds to operation 314, where the processor validates that a security policy is satisfied for a number and identity of valid committing-peer verifiable credentials for a particular holder. In some embodiments, the method 350 proceeds to operation 316, where the processor composes and issues a schema-compliant verifiable asset credential asserting various asset claims to the policy-designated holders. In some embodiments, after operation 316, the method 350 (and/or the method 300) may end. It is noted that in some embodiments, operations 310-318 may be a continuation of the method 300 (e.g., operations 302-308) presented in FIG. 3A or may be separate operations performed at another time, e.g., separately as the method 350.

In some embodiments, a verifiable asset credential can represent all of the same information held on-ledger but provides a more portable tamper-evident and trustworthy counterpart as compared to querying one or more node ledgers. Thus the assertions in a blockchain-issued VAC can be considered a true representation of the on-ledger asset state and is likely to not be tampered with. It is noted that the use of blockchain-issued verifiable asset credential allows for accurate on-ledger state information for an asset to be distributed, held, presented and verified off-network, thus alleviating the need to access a network to query one or more peers/nodes.

Turning back to the method 300 (and/or the method 350), an example is now discussed. For example, a first schema and security policy related to a subject-held VAC for a patient's medical record may indicate that the asset credential issuer 214 needs to receive subject-held schema-compliant committing-peer VCs from only peers X, Y, and Z. This subject-held VAC would include both sensitive and non-sensitive patient data. Whereas, a second non-subject-held schema for a patient medical record may include only non-sensitive, anonymized patient data that will be issued to the patients designated insurance company. This non-subject-held version of the patient record requires only two out of three committing peer VACs from peers X, Y, and Z.

Accordingly, the schemas involving the two versions of a patient's medical records are registered as part of the blockchain configuration 204, 206 and the VC security policies for the subject-held and non-subject-held VACs designate which schema to use for which holder of a VAC and which committing-peer VCs are required by for each schema. The asset credential issuer 214 then subscribes to the designated committing peers 210—in this case peers X, Y, and Z.

In some embodiments, discussed below, there are one or more operations of the method 300 not depicted for the sake of brevity. Accordingly, in some embodiments, the processor may (further) revoke one or more previously issued verifiable asset credentials for a given asset. For example, if an asset has its ownership transferred, new VAC(s) asserting the new owner would be issued to the asset (subject-held VAC) and to any non-subject-held entities and the VAC(s) that asserted the old owner would be revoked and therefore become unverifiable. Furthering the example, ownership of a car is transferred from one car dealership A to another B, the VACs asserting the owner as A would be revoked and new VAC(s) asserting the owner as B would be issued.

In some embodiments, the one or more verifiable credential schemas may include a security policy and the security policy may include a selection of one or more peers required to provide committing-peer VCs to the asset credential issuer 214 in order for the asset credential issuer to issue the VAC. Referring back to the previous patient medical record example, for patient-held VACs, the asset credential issuer 214 required committing-peer VCs from peers X, Y and Z.

But non-subject-held VACs only required two of the three same peers. In some embodiments the designated peers would not overlap.

In some embodiments, the processor may issue a transaction commit notification in the form of a committing-peer verifiable credential. The processor may generate a notification in the form of a committing-peer verifiable credential schema. In some embodiments, the committing-peer verifiable credential schema may include some or all of the on-ledger current state data for that asset. In some embodiments, the committing peer verifiable credential schema may include fields populated using peer-held off-ledger data including privately distributed data.

In some embodiments, the processor may collect and validate committing-peer VCs from one or more pre-designated peers per the VAC's associated schema and security policy. As in the previous patient medical record example, valid committing-peer VC's were required from some combination of peers X, Y, and Z based on to whom the VAC was to be issued, the subject or a non-subject). In some embodiments, validation of a committing-peer VC includes ensuring conformance to the committing peer schema (for example, all required fields per the schema are populated), and that the committing-peer's digital signature is valid. In addition, validation includes ensuring that valid committing-peer VCs were received from correct combination of pre-designated committing peers per the security policy. Again per the previous example, subject-held VAC (patent-held medical record) required valid committing-peer VCs from X, Y and Z while non-subject-held VACs (insurance company-held version of the patient's medical record) only required 2 out of three peers.

In some embodiments, the processor may compose a verifiable asset credential based on the one or more committing-peer issued verifiable credentials. After validating the compliance of the collected committing-peer-issued VCs to the associated schema and security policies, the processor may issue (create and digitally sign) a verifiable asset credential asserting claims taken directly from or composed from the validated committing-peer-issued VCs. For example, in a car sales transaction, each committing-peer issued VC may assert detailed pricing attributes. The asset credential issuer may add together the various pricing attributes in order to assert just the total price in conformance with a non-subject-held VAC schema.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4A:
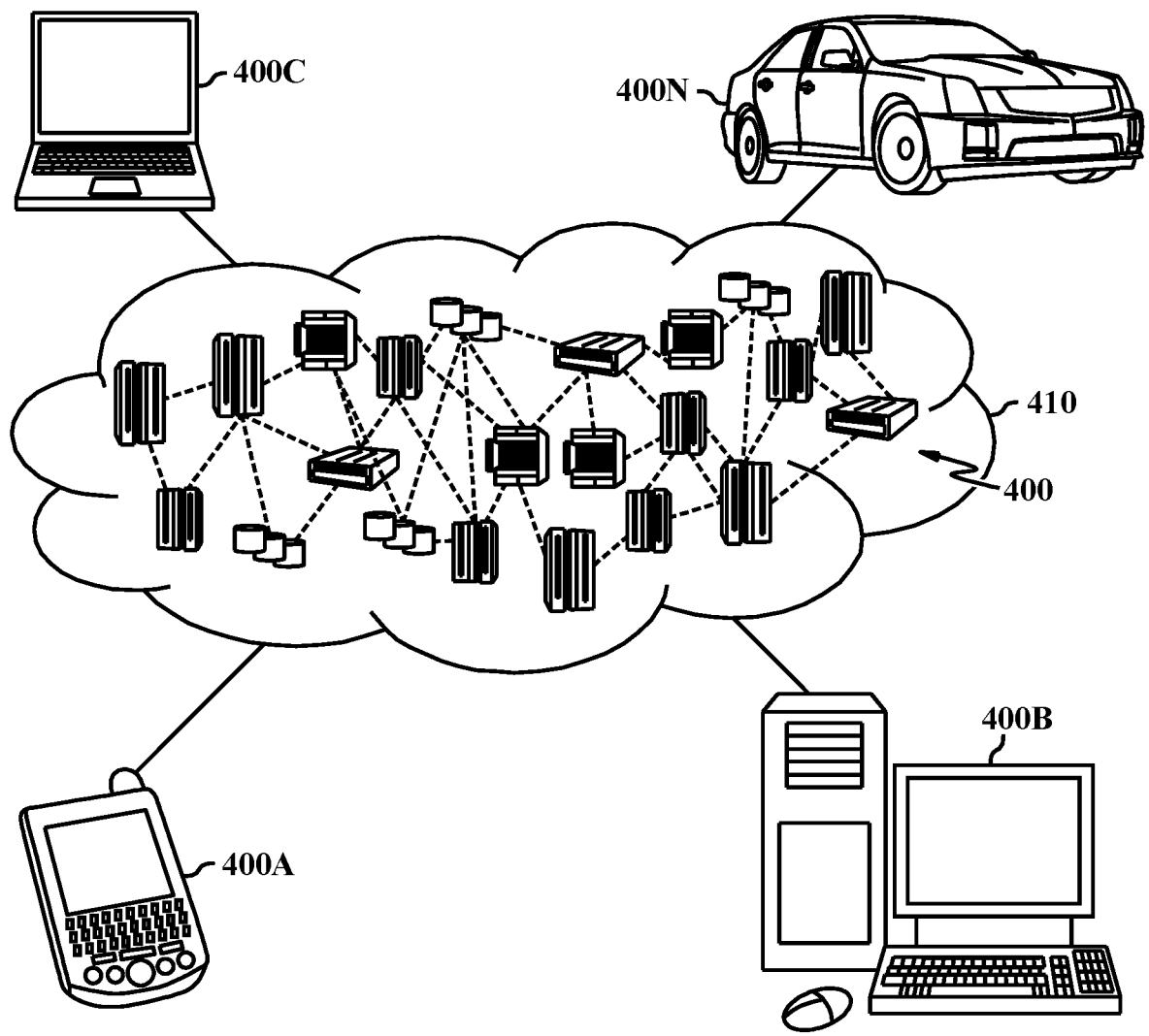
FIG. 4A illustrates a cloud computing environment, in accordance with embodiments of the present disclosure.

FIG. 4A, illustrated is a cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4A are intended to be illustrative only and that computing nodes 400 and cloud computing environment 410 can communicate with any type of computerized device over any type of network and/or network addressable connection (e.g., using a web browser).

Figure 4B:
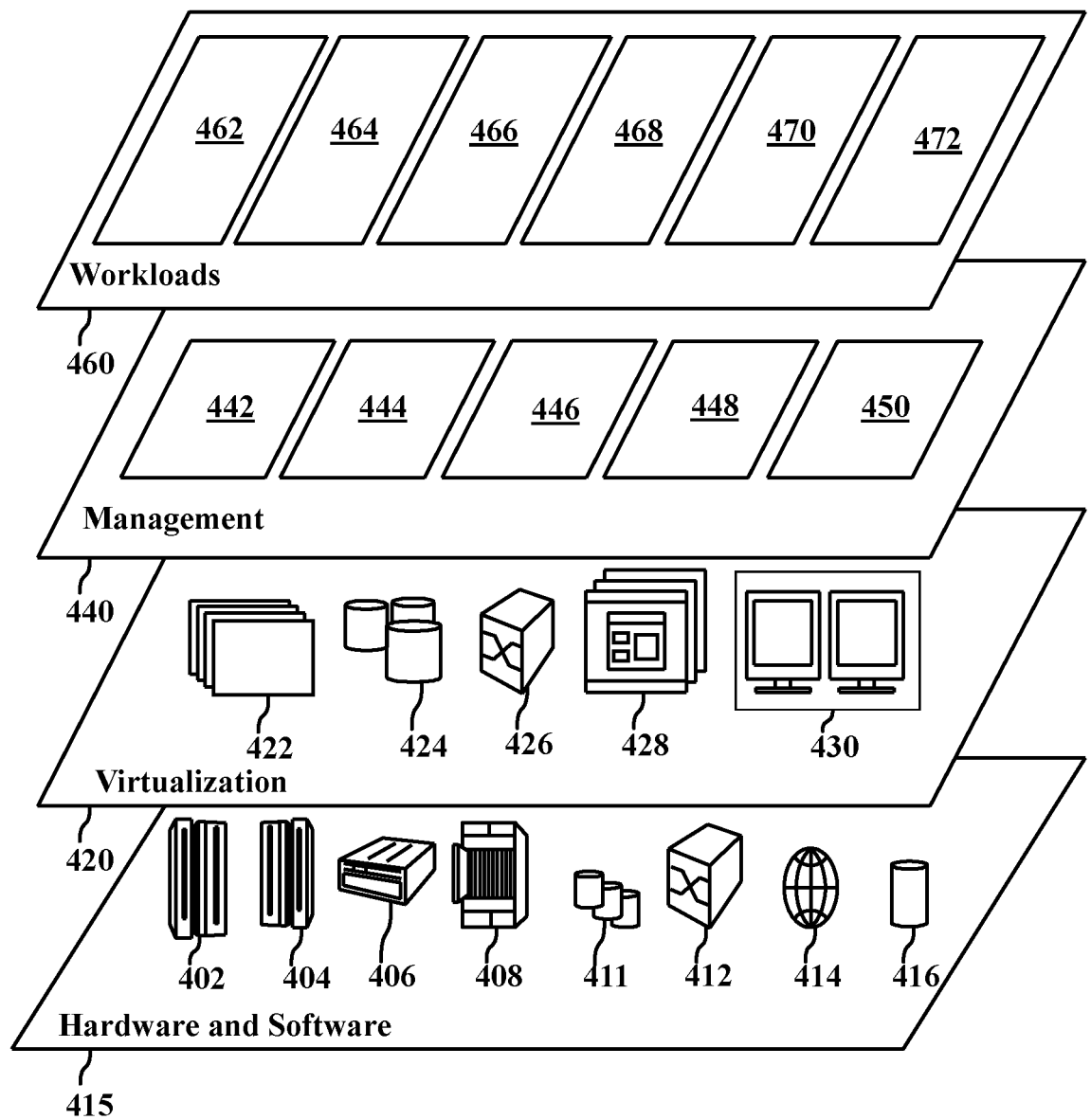
FIG. 4B illustrates abstraction model layers, in accordance with embodiments of the present disclosure.

FIG. 4B, illustrated is a set of functional abstraction layers provided by cloud computing environment 410 (FIG. 4A) is shown. It should be understood in advance that the components, layers, and functions shown in FIG. 4B are intended to be illustrative only and embodiments of the disclosure are not limited thereto. As depicted below, the following layers and corresponding functions are provided.

Hardware and software layer 415 includes hardware and software components. Examples of hardware components include: mainframes 402; RISC (Reduced Instruction Set Computer) architecture based servers 404; servers 406; blade servers 408; storage devices 411; and networks and networking components 412. In some embodiments, software components include network application server software 414 and database software 416.

Virtualization layer 420 provides an abstraction layer from which the following examples of virtual entities may be provided: virtual servers 422; virtual storage 424; virtual networks 426, including virtual private networks; virtual applications and operating systems 428; and virtual clients 430.

In one example, management layer 440 may provide the functions described below. Resource provisioning 442 provides dynamic procurement of computing resources and other resources that are utilized to perform tasks within the cloud computing environment. Metering and Pricing 444 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 446 provides access to the cloud computing environment for consumers and system administrators. Service level management 448 provides cloud computing resource allocation and management such that required service levels are met. Service Level Agreement (SLA) planning and fulfillment 450 provide pre-arrangement for, and procurement of, cloud computing resources for which a future requirement is anticipated in accordance with an SLA.

Workloads layer 460 provides examples of functionality for which the cloud computing environment may be utilized. Examples of workloads and functions which may be provided from this layer include: mapping and navigation 462; software development and lifecycle management 464; virtual classroom education delivery 466; data analytics processing 468; transaction processing 470; and reducing loads on blockchain peers for trusted asset data claims 472.

Figure 5:
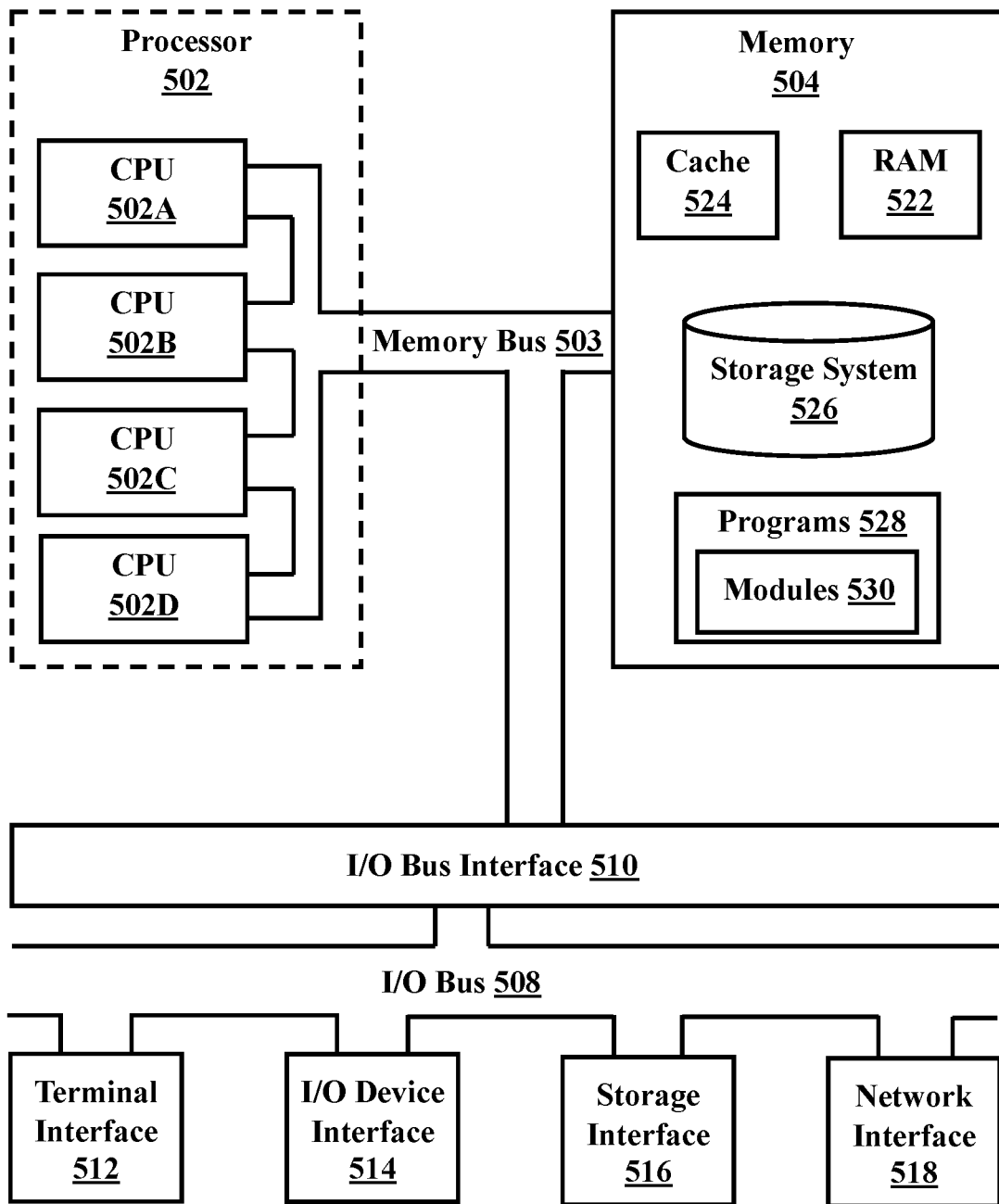
FIG. 5 illustrates a high-level block diagram of an example computer system that may be used in implementing one or more of the methods, tools, and modules, and any related functions, described herein, in accordance with embodiments of the present disclosure.

FIG. 5, illustrated is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for portable trusted asset claims via blockchain-issued verifiable credentials asserting on-ledger data, the method comprising:
    registering one or more verifiable credential schemas, wherein a verifiable credential schema is the prescribed format and content for asserting various claims about an asset backed by a blockchain ledger;

registering an asset credential issuer policy for the verifiable asset credentials, wherein the issuer policy is associated with one or more verifiable asset credential schema(s);

subscribing the asset credential issuer to one or more designated peers on the blockchain;

designating a required combination of committing-peer-issued verifiable credentials that are required be received to be considered valid;

issuing, upon committing a transaction, schema-compliant committing-peer verifiable credentials to an asset credential issuer;

collecting and validating a signature and schema conformance of the committing-peer verifiable credentials;

validating that a security policy is satisfied for a number and identity of valid committing-peer verifiable credentials for a particular holder; and composing and issuing a schema-compliant verifiable asset credential asserting various asset claims to the policy-designated holders.

2. The method of claim 1, further comprising:
revoking one or more previously issued verifiable asset credentials.

3. The method of claim 1, wherein the one or more verifiable credential schemas include a security policy, and wherein the security policy includes a selection policy of the one or more peers required to provide committing peer notifications in the form of a schema-compliant committing-peer verifiable credential.

4. The method of claim 3, further comprising:
upon committing an asset transaction, issuing a transaction commit notification, wherein the transaction commit notification is in the form of a schema-compliant verifiable credential.

5. The method of claim 1, further comprising:
collecting the committing-peer verifiable credentials from one or more peers; and
validating the committing-peer verifiable credential digital signature and the format and content conforms to the required schema; and
validating the number and identity of committing peers satisfies the issuer security policy for the designated holder of the verifiable asset credential.

6. The method of claim 5, further comprising:
composing a schema-compliant verifiable asset credential based on the one or more validated committing-peer verifiable credentials received; and
issuing the asset verifiable credential to the policy-designated holder(s).

7. The method of claim 6, further comprising:
querying blockchain-backed asset attributes via the holders of verifiable asset credentials who generate a verifiable presentation of the credential; and
validating the asset attributes.

8. A system for portable trusted asset claims via blockchain-issued verifiable credentials, the system comprising:
a memory; and
a processor in communication with the memory, the processor being configured to perform operations comprising:
registering one or more verifiable credential schemas, wherein a verifiable asset credential schema is the prescribed format and content of asserting blockchain-backed asset state;
registering an issuer policy for the verifiable asset credentials, wherein the issuer policy is associated with a schema and intended holder;
subscribing the asset credential issuer to one or more peers on the blockchain;
issuing commit notifications to a subscribing asset credential issuer in the form of schema-compliant committing-peer verifiable credentials;
collecting and validating a signature and schema conformance of the committing-peer verifiable credentials;
validating that a security policy is satisfied for a number and identity of valid committing-peer verifiable credentials for a particular holder; and
composing and issuing a schema-compliant verifiable asset credential asserting various asset claims to the policy-designated holders.

9. The system of claim 8, wherein the operations further comprise:
revoking one or more previously issued verifiable asset credentials.

10. The system of claim 8, wherein the one or more verifiable credential schemas include a security policy designating the one or more peers required to issue committing peer notifications in the form of a schema-compliant committing-peer verifiable credential for a particular intended holder.

11. The system of claim 10, wherein the operations further comprise:
upon committing an asset transaction, issuing a transaction commit notification, wherein the transaction commit notification is in the form of a schema-compliant verifiable credential.

12. The system of claim 8, wherein the operations further comprise:
collecting the committing-peer verifiable credentials from one or more peers; and
validating the committing-peer verifiable credential digital signature and the format and content conforms to the required schema; and
validating the number and identity of committing peers satisfies the issuer security policy for the designated holder of the verifiable asset credential.

13. The system of claim 12, wherein the operations further comprise:
composing a schema-compliant verifiable asset credential based on the one or more validated committing-peer verifiable credentials received; and
issuing the asset verifiable credential to the policy-designated holder(s).

14. The system of claim 13, wherein the operations further comprise:
querying blockchain-backed asset attributes via the holders of verifiable asset credentials who generate a verifiable presentation of the credential;
validating the asset attributes.

15. A computer program product for portable trusted asset claims via blockchain-issued verifiable credentials, the computer program product comprising a computer readable storage medium having program instructions embodied therewith, the program instructions executable by a processor to cause the processors to perform a function, the function comprising:
registering one or more verifiable credential schemas, wherein a verifiable asset credential schema is the prescribed format and content of asserting blockchain-backed asset state;
registering an issuer policy for the verifiable asset credentials, wherein the issuer policy is associated with a schema and intended holder;

subscribing the asset credential issuer to one or more peers on the blockchain; and issuing commit notifications to a subscribing asset credential issuer in the form of schema-compliant committing-peer verifiable credentials;

collecting and validating a signature and schema conformance of the committing-peer verifiable credentials;

validating that a security policy is satisfied for a number and identity of valid committing-peer verifiable credentials for a particular holder; and composing and issuing a schema-compliant verifiable asset credential asserting various asset claims to the policy-designated holders.

16. The computer program product of claim 15, wherein the functions further comprise:

revoking one or more previously issued verifiable asset credentials.

17. The computer program product of claim 15, wherein the one or more verifiable credential schemas include a security policy designating the one or more peers required to issue committing peer notifications in the form of a schema-compliant committing-peer verifiable credential for a particular intended holder.

18. The computer program product of claim 17, wherein the functions further comprise:

upon committing an asset transaction, issuing a transaction commit notification, wherein the transaction commit notification is in the form of a schema-compliant verifiable credential.

19. The computer program product of claim 15, wherein the functions further comprise:

collecting the committing-peer verifiable credentials from one or more peers; and validating the committing-peer verifiable credential digital signature and the format and content conforms to the required schema; and validating the number and identity of committing peers satisfies the issuer security policy for the designated holder of the verifiable asset credential.

20. The computer program product of claim 19, wherein the functions further comprise:

composing a schema-compliant verifiable asset credential based on the one or more validated committing-peer verifiable credentials received; and issuing the asset verifiable credential to the policy-designated holder(s).

* * * * *